United States Patent
Bensch et al.

(10) Patent No.: US 8,794,718 B2
(45) Date of Patent: *Aug. 5, 2014

(54) VALVE UNIT FOR AN ELECTRO-PNEUMATIC BRAKE CONTROL DEVICE FOR CONTROLLING A PARKING BRAKE

(75) Inventors: Uwe Bensch, Hannover (DE); Jörg Helmer, Vogt (DE); Reiner Hölscher, Seelze (DE); Bernd-Joachim Kiel, Wunstorf (DE); Wilfried Menze, Springe (DE); Juan Rovira-Rifaterra, Garbsen (DE)

(73) Assignee: WABCO GmbH, Hannover (DE)

( * ) Notice: Subject to any disclaimer, the term of this patent is extended or adjusted under 35 U.S.C. 154(b) by 1144 days.

This patent is subject to a terminal disclaimer.

(21) Appl. No.: 12/310,176

(22) PCT Filed: Jul. 4, 2007

(86) PCT No.: PCT/EP2007/005908
§ 371 (c)(1),
(2), (4) Date: Jun. 9, 2009

(87) PCT Pub. No.: WO2008/025398
PCT Pub. Date: Mar. 6, 2008

(65) Prior Publication Data
US 2009/0309413 A1 Dec. 17, 2009

(30) Foreign Application Priority Data
Aug. 31, 2006 (DE) .......... 10 2006 041 010

(51) Int. Cl.
*B60T 8/36* (2006.01)
*F16K 31/06* (2006.01)
*F15B 13/04* (2006.01)

(52) U.S. Cl.
USPC ............ 303/119.2; 137/596.17; 137/596.1

(58) Field of Classification Search
USPC .......... 303/119.1, 119.2, 118.1, 37; 137/870, 137/596.17, 596.1; 251/129.1
See application file for complete search history.

(56) References Cited

U.S. PATENT DOCUMENTS

| 4,655,255 A | 4/1987 | Rode |
| 5,184,878 A * | 2/1993 | Woerner ............... 303/118.1 |

(Continued)

FOREIGN PATENT DOCUMENTS

| DE | 35 01 708 A1 | 7/1986 |
| DE | 103 36 611 A1 | 3/2005 |
| EP | 08 93 635 B1 | 1/1999 |
| EP | 1 571 061 A1 | 9/2005 |
| WO | WO 2006/007970 A | 1/2006 |

*Primary Examiner* — Vishal Sahni
(74) *Attorney, Agent, or Firm* — Kramer Levin Naftalis & Frankel LLP

(57) ABSTRACT

A valve unit for an electro-pneumatic brake control is connected to an input of an air-quantity-boosting valve for the aeration/venting thereof. A double-armature solenoid valve includes primary and secondary armatures each spring-loaded and actuated by a common magnet coil. The primary armature is a switch for a vent valve; the secondary armature is a switch for an intake valve. When the coil is not drawing current, the armatures are in spring-loaded position, the intake valve blocking intake and the vent valve venting. When a first current flows through the coil, the primary armature enters switching position, with the secondary armature in spring-loaded position; the intake valve blocking intake and the vent valve blocking venting. When a second current greater than the first flows through the coil, both primary and secondary armatures are moved into switching positions, so that the intake valve admits air and the vent valve blocks venting.

21 Claims, 4 Drawing Sheets

(56) References Cited

U.S. PATENT DOCUMENTS

| | | | |
|---|---|---|---|
| 5,409,303 A * | 4/1995 | Engelbert et al. | 303/118.1 |
| 6,026,860 A | 2/2000 | Teichmann | |
| 8,297,714 B2 * | 10/2012 | Bensch et al. | 303/7 |
| 2005/0029859 A1 | 2/2005 | Bensch et al. | |
| 2010/0072810 A1 * | 3/2010 | Bensch et al. | 303/17 |

* cited by examiner

VALVE UNIT FOR AN ELECTRO-PNEUMATIC BRAKE CONTROL DEVICE FOR CONTROLLING A PARKING BRAKE

FIELD OF THE INVENTION

The present invention generally relates to a valve unit for an electro-pneumatic brake control device for controlling a parking brake. The present invention also relates to the electro-pneumatic brake control device and an electrically controlled pneumatic vehicle brake system equipped therewith.

BACKGROUND OF THE INVENTION

Valve devices for electro-pneumatic brake control devices for controlling vehicle parking brakes are known, for example, from DE 103 36 611 A1 or EP 1 571 061 A1. These known brake control devices are used in brake systems provided not only with a service brake, which can be actuated by means of a brake pedal, but also with a parking brake (often also referred to as a handbrake), which can be actuated by means of an electrical signal transducer.

In these known brake systems, the parking brake is regularly applied by means of brake cylinders designed as spring-actuated brake cylinders. In order to release the parking brake, the spring-actuator part of the spring-actuated brake cylinders is pressurized with compressed air. For this purpose, air is admitted to the spring-actuator part. The necessary pressure for air admission is supplied from a compressed-air reservoir. However, this pressure supply is not permanently turned on, but may even be shut off. Furthermore, the pressure in the spring-actuated brake cylinder may also be lowered, and so the spring-actuator part may be vented.

To control the pressure in the spring-actuated brake cylinder, conventionally, a relay valve is provided by means of which the pressure supply from the compressed-air reservoir tank to the spring-actuator part of the spring-actuated brake cylinders can be controlled. Control is exercised with the assistance of electro-pneumatic valve devices, especially, by means of electrically actuatable solenoid valves, that regulate a control pressure supplied to the relay valve.

In the known brake system described in DE 103 36 611 A1, a bistable valve, or, in other words, a valve that can occupy two stable conditions and that, in the event of a power failure, maintains the condition set at that instant, is used for this purpose. Furthermore, a holding valve is connected between the bistable valve and the control input of the relay valve in this brake system. By means of the bistable valve and of the holding valve, the pressure at the control input can be held, raised or lowered. The pressure at the output of the relay valve varies correspondingly. In this way, the parking brake can be released or applied by means of electrical signals to the bistable valve and holding valve.

Because of its construction, however, the bistable valve is complex and therefore can be expensive. Furthermore, as noted above, the bistable valve remains in its previous condition in the event of failure of the electrical power supply. Thus, a vehicle having such a brake system, in the event of failure of the electrical power supply, cannot be parked such that the spring-actuator part of the spring-actuated brake cylinder is vented and, as a result, the parking brake is applied.

Electromagnetically actuatable multi-way valves of less complex construction have been proposed in DE 35 01 708 A1. In particular, it was proposed that two valves disposed opposite one another be provided in a multi-way valve. Armatures that cooperate with a coil disposed between the two valves are associated with each of these two valves. The springs associated with these armatures are designed such that different magnetic forces are necessary for actuation of the two valves. These magnetic forces are generated by application of a current flowing through the coil. Because a separate armature is associated with each valve, mutually independent actuation of the two valves is possible by appropriate energization of the coil.

However, in the de-energized state of this known valve, the input of the valve unit is in communication with the output leading to the consuming load. If such a valve unit were to be used instead of the bistable valve and holding valve discussed above, the full reservoir pressure might be applied to the control input of the relay valve in the event of failure of the electrical power supply, thus, potentially causing the parking brake to be released by the resulting admission of air to the spring-actuator part of the spring-actuated brake cylinders. These known valves might not, therefore, be best suited for controlling the pressure in a spring-actuated brake cylinder of a parking brake.

SUMMARY OF THE INVENTION

Generally speaking, in accordance with embodiments of the present invention, a simple, suitable valve unit for an electro-pneumatic brake control device for controlling a parking brake is provided that permits the vehicle to be parked safely even in the event of failure of the electrical voltage supply.

The inventive valve unit is constructed and arranged such that, in the de-energized condition, no air is admitted to an air-flow-boosting valve device, but, instead, the valve device is vented. Thus, the control input of the air-flow-boosting valve device is permanently vented even in the event of failure of the electrical power supply. A parking brake system having spring-actuated brake cylinders can be connected to the output of the air-flow-boosting valve device. Such spring-actuated brake cylinders are constructed and arranged such that they apply the parking brake in the vented condition, and only when air is being admitted to the spring-actuated brake cylinders do they release the parking brake. In this way, venting of the spring-actuated brake cylinders of the parking brake is ensured and, thus, the parking brake is applied even in the event of failure of the electrical power supply.

In an embodiment of the inventive valve unit provided as a double-armature solenoid valve, two valves, namely, an air-admission valve and a vent valve, can be actuated with only one coil. This reduces the complexity of the construction of the valve unit. Also, the complexity of contacting and of electrical activation of the valve unit is reduced, since only two ports are necessary for the solenoid. Likewise, the number of output stages needed for energization of this solenoid valve is reduced, including the components belonging to the output stages. Furthermore, the entire current consumption is reduced by the use of only one coil for two valves. As a result, more favorable heating behavior of the brake control device is achieved.

Furthermore, the construction of the inventive valve unit is compact compared with a conventional valve unit comprising a bistable valve and a holding valve. By virtue of the more compact construction and of the smaller number of components, it is also possible to lower the manufacturing costs significantly.

The valve unit according to embodiments of the present invention can be constructed and arranged either as a stand-alone device or as a non-independent, integral part of a brake control device.

When the solenoid is de-energized, both the primary armature and the secondary armature of the double-armature solenoid valve are located in a home position established by corresponding springs, in which position the vent valve of the double-armature solenoid valve activates venting of the control input of the air-flow-boosting device, especially, by placing a connecting member, referred to as the third connecting member, leading to the control input of the air-flow-boosting valve device in communication with a connecting member, referred to as the second connecting member, leading to a venting device. In this way, the control input can be vented. At the same time, the air-admission valve is located in its home position, specifically, such that admission of air to the control input of the air-flow-boosting valve device is shut off, especially, because a first connecting member of the valve unit leading to the compressed-air reservoir is shut off from the third connecting member leading to the control input of the air-flow-boosting valve device. No further compressed air is supplied to the control input. In the de-energized condition, therefore, permanent, throttled, venting of the control input of the air-flow-boosting valve device is achieved and, thus, via the air-flow-boosting valve device, the spring-actuated brake cylinders are vented. In this way, it is ensured that the parking brake is applied.

Upon injection of a first low current into the solenoid, only the primary armature and, thus, the vent valve of the valve unit is energized at first, and, in this way, is displaced to its switched position. At this low current, however, the secondary armature remains in its spring-loaded home position. In the switched position of the primary armature, venting of the control input of the air-flow-boosting valve device is shut off by means of the vent valve, especially, since the second connecting member leading to the venting device is shut off from the third connecting member leading to the control input. In this way, the pressure at the control input can be held at its existing value. By injection of a higher current into the solenoid, the secondary armature is then also displaced to its switched position, and, so, the air-admission valve activates admission of air to the control input of the air-flow-boosting valve device. In particular, this air-admission valve places the first connecting member leading to the compressed-air reservoir in communication with the third connecting member leading to the control input. Because of such communication, air is admitted to the air-flow-boosting valve device and, consequently, to the spring-actuator part of the spring-actuated brake cylinder. In this condition, the parking brake is released, and, so, the vehicle is now in a drivable condition.

When the solenoid is de-energized, the vent valve preferably places the second connecting member leading to the venting device in communication with the third connecting member leading to the air-flow-boosting valve device via an orifice or throttle. In this way, the control input of the air-flow-boosting valve device can be vented in throttled manner. This has the advantage that the vehicle can be braked slowly and parked safely even in the event of failure of the electrical power supply, especially, of the brake control device. This is achieved by an orifice acting as a throttle on the vent valve of the valve unit, which is active in the de-energized condition of the solenoid. That is, the pressure at the control input of an air-flow-boosting valve device is slowly lowered via this orifice, and, so, the pressure in the spring-actuator part of the spring-actuated brake cylinder is also lowered slowly and, thus, the parking brake is applied slowly.

Preferably, the solenoid is supplied with an alternating solenoid current, especially, a pulsed solenoid current, this alternating current being of such magnitude that the primary armature is actuated in pulsed manner, whereas the secondary armature remains in its home position, without being actuated. In this way, rapid venting of the control chamber of the air-flow-boosting valve device can be achieved. In particular, by rapidly switching the vent valve to and fro between its home position and its switched position, compressed air from the control chamber of the air-flow-boosting valve device passes first to a first outlet of the vent valve, which is in communication with the throttle of the vent valve. Therefore, the compressed air actually cannot escape rapidly via this path. By virtue of the immediately following changeover of the vent valve to its switched position, the compressed air now present upstream from the throttle is discharged directly to a venting device via a corresponding path or duct in the vent valve. The amount of air escaping in a single switching operation is not very large during a single switching operation of the vent valve, and it depends on an available volume. Nevertheless, rapid venting of the control chamber of the air-flow-boosting valve device can be achieved by switching to and fro frequently and rapidly. For this purpose, a compressed-air accumulator is advantageously provided between the orifice and an outlet of the vent valve, in order to increase the amount of air to be discharged.

In a preferred embodiment, the alternating solenoid current jumps to and fro between the value zero and a value corresponding to the intensity of the first solenoid current. This embodiment has the advantage that this first solenoid current merely has to be pulsed, or, in other words, turned on and off. Alternatively, the alternating solenoid current can also be generated between two closely spaced current values; as a result, the switched positions of the primary armature can be changed over more rapidly.

In a further embodiment, the primary armature and the secondary armature have different diameters. In particular, the secondary armature has a smaller diameter than the primary armature. As a result, the structure of the armature-guide arrangement can advantageously be configured such that the armature-guide tube, together with the two magnet armatures, can be mounted in the coil from one side. Also, advantageously, by virtue of the different sizes, especially, diameters, of the armatures, different magnetic forces act on the armatures. As a result, the switching behavior of the valve unit can be favorably influenced. As discussed above, it is intended specifically that the primary armature will be pulled in first by the solenoid and that the secondary armature will also be pulled in only at a higher current.

Advantageously, the primary armature and the secondary armature are pulled to different depths into the solenoid. In particular, the primary armature is pulled more deeply into the solenoid than is the secondary armature. This has the advantage that the magnetic force exerted by the solenoid on the primary armature is greater than the magnetic force exerted by the solenoid on the secondary armature. As a result, the switching behavior of the valve unit is favorably influenced.

In a further embodiment, the spring force exerted on the primary armature by an associated spring is smaller than the spring force exerted on the secondary armature by a further spring associated with the secondary armature. Advantageously, springs of different strengths are used for this purpose. The switching behavior of the solenoid-valve system is also improved by this measure.

In a still further embodiment, the primary armature and the secondary armature are of identical design. This has the advantage that the manufacturing costs of these armatures can be reduced by virtue of larger production runs.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

The present invention will be described in greater detail hereinafter on the basis of the accompanying drawings, wherein.

DETAILED DESCRIPTION OF THE PREFERRED EMBODIMENTS

Figure 1:
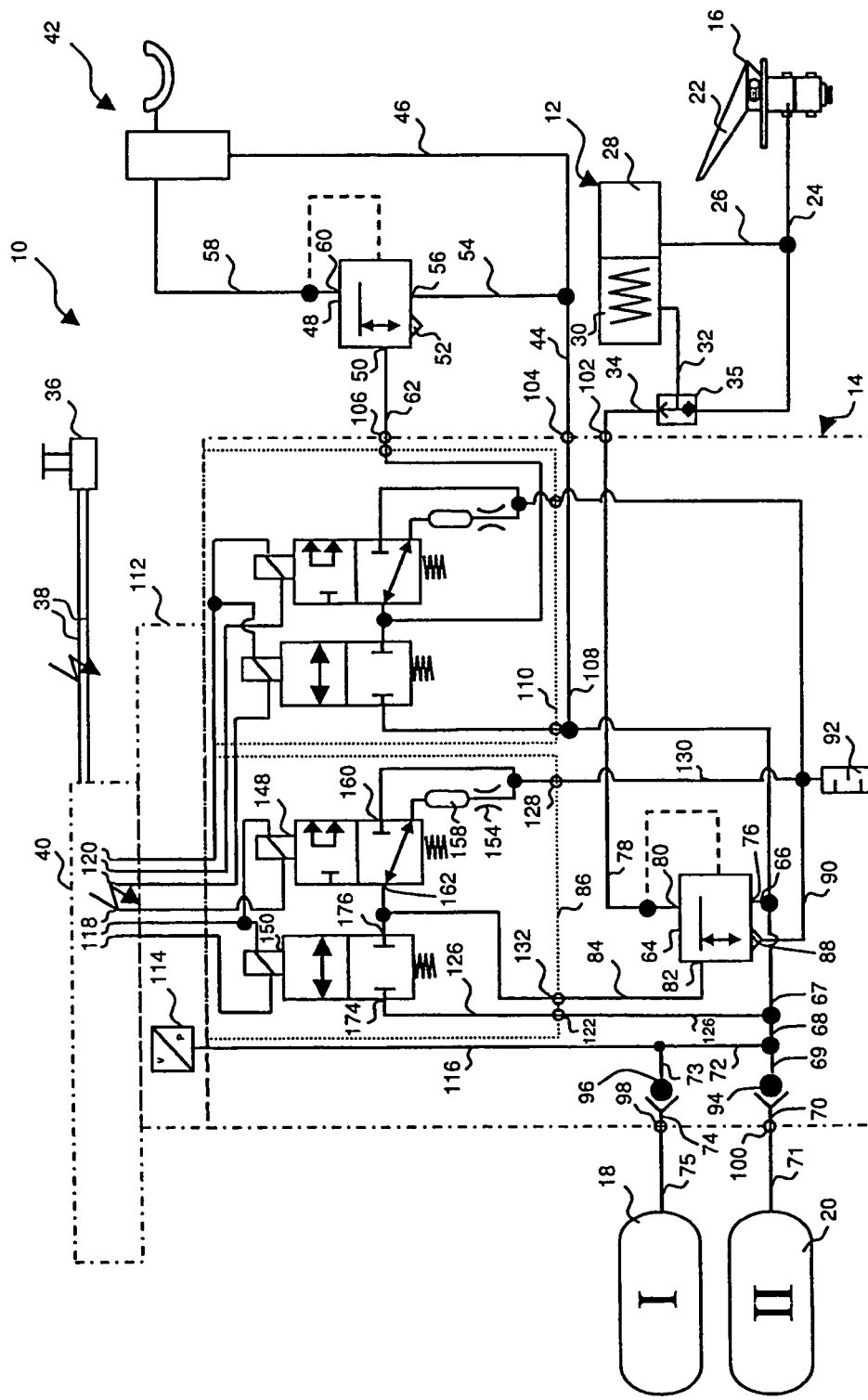
FIG. 1 is a simplified schematic diagram of an air-brake system having an electro-pneumatic brake control device for controlling a parking brake, including two valve units according to an exemplary embodiment of the present invention.

Referring now to the drawing figures, FIG. 1 schematically shows part of an air-brake system 10 for a vehicle, especially, an electro-pneumatic brake control device for controlling a parking brake of the vehicle. Such air-brake systems are used, for example, in commercial vehicles, heavy motor trucks or buses, and, in particular, in vehicle trains comprising a tractor and a trailer.

FIG. 1 shows the components of brake system 10 that are helpful for understanding the present invention. Brake system 10 is electrically controlled, meaning that the metering of brake pressure to the brake cylinders for actuation of wheel brakes provided on the vehicle wheels is controlled by electrical or electronic control elements. The brake cylinders are designed partly or completely as combination service and spring-actuated brake cylinders 12 (for clarity, only one such brake cylinder is illustrated in FIG. 1), the spring-actuator part being controlled by an electro-pneumatic brake control device constructed and arranged as parking brake module 14 for controlling the parking brake.

Brake system 10 is provided with a brake force transducer 16, which senses a braking intent of the driver. Brake force transducer 16 comprises an electrical part and a pneumatic or hydraulic part, only the pneumatic part being illustrated in FIG. 1. Via compressed-air lines (not illustrated), the pneumatic part is supplied with compressed air by a first compressed-air reservoir tank 18 and a second compressed-air reservoir tank 20. Compressed-air reservoir tanks 18, 20 are used to supply compressed air to the brake cylinders of the service brakes. As illustrated in FIG. 1, however, they can also be used to supply compressed air to the parking brake. Alternatively, the compressed air for the parking brake can be supplied by a separate compressed-air reservoir tank.

By actuation of a brake pedal 22, brake force transducer 16 generates a pneumatic manipulated variable either by electrical activation of electro-pneumatic devices or directly, the variable being passed via a compressed-air line 24, 26 to combination service and spring-actuated brake cylinder 12.

Combination service and spring-actuated brake cylinder 12 is designed as a combination spring-actuator/diaphragm cylinder. Aside from its function as a diaphragm cylinder, it additionally has a spring-actuator function. Brake cylinder 12 is, therefore, provided with a diaphragm part 28, which is in communication pneumatically with the service brake system and can be pressurized with the actual brake pressure, and with a spring-actuator part 30, which is pneumatically separated from diaphragm part 28 and can be pressurized with compressed air via separate compressed-air lines 32, 34. Spring-actuator part 30 forms part of the parking brake. Spring-actuator part 30 includes the spring-actuator function, which preloads an actuator spring upon pressurization of spring-actuator part 30 and, thus, prevents or diminishes braking action of the spring-actuator function, whereas the actuator spring relaxes upon venting of spring-actuator part 30 and, thus, in connection with the spring-actuator function, exerts a braking action on the brake in communication with the respective brake cylinder. In the present context, brake cylinders of this type will be referred to as spring-actuated brake cylinders.

To prevent mechanical overloading of the brake mechanism, an overload protection valve 35 is provided in the form of a changeover valve or select-high valve connected between spring-actuator part 30, a pneumatic output 102 of parking brake module 14 and the output of brake force transducer 16 having the modulated pressure. This overload protection valve 35 selects the higher of the two pressures, namely, the modulated brake pressure at the output of brake force transducer 16 and the pressure made available by air-flow-boosting valve device 67, and it supplies this to spring-actuator part 30 of spring-actuated brake cylinder 12. Overload protection valve 35 prevents addition of the brake force supplied by the service brake, or, in other words, via the pneumatic part or diaphragm part 28, to the brake force supplied by the parking brake, or, in other words, spring-actuator part 30, to prevent mechanical overloading of the brake mechanism of the wheel brake associated with this brake cylinder. By virtue of the illustrated structure, the brake force supplied to the brake cylinder via diaphragm part 28 is not increased by the brake force exerted by spring-actuator part 30, since, in the case of actuation of the service brake, the brake force exerted by the actuator spring is reduced by a force corresponding to actuation of the service brake. In this way, critical overloading of the corresponding wheel brake can be avoided.

By means of the spring-actuated brake cylinder, a parking brake function is achieved that also permits the vehicle to be braked or immobilized even in the absence of compressed air. The parking brake function is active when the respective spring-actuator part 30 of spring-actuated brake cylinder 12 is vented below a minimum pressure value. Via compressed-air lines 32, 34, spring-actuator part 30 of brake cylinder 12 is pneumatically in communication with parking brake module 14, which permits pressure control by way of electronic control means.

A manually actuatable parking brake signal transducer 36 is electrically connected via a multi-conductor electrical line 38 to an electronic control unit 40 of parking brake module 14.

Via appropriate electrical lines, the electrical devices in the vehicle are supplied with energy by an electrical power supply device, not illustrated, such as, for example, a vehicle battery.

The vehicle is suited for coupling a trailer having a further parking brake equipped with spring-actuated brake cylinders. Brake system 10 is, therefore, provided with what is known as a tractor-truck protection valve 42, which is used for brake-pressure control, especially, of the parking brake of the trailer. Via compressed-air lines 44, 46, tractor-truck protection valve 42 is supplied with the reservoir pressure of compressed-air reservoir tanks 18, 20. Furthermore, a pressure modulated by means of an air-flow-boosting valve device, namely, a relay valve 48, for the parking brake of the trailer is supplied to tractor-truck protection valve 42.

Relay valve 48 is provided with a control input 50, a vent port 52 that can be placed indirectly or directly in communication with atmosphere and an inlet 56 that, via a compressed-air line 54, can be placed in communication with the reservoir pressure of compressed-air reservoir tanks 18, 20 as well as an outlet 60 that, via a compressed-air line 58, can be placed in communication with tractor-truck protection valve 42. Via a compressed-air line 62, control input 50 is in communication with parking brake module 14.

At its outlet 60, relay valve 48 delivers to compressed-air line 58 an output pressure that corresponds to the pressure injected via compressed-air line 62 at control input 50 and, thus, to the pressure in a control chamber of relay valve 48. Relay valve 48 draws the compressed air needed for this purpose from compressed-air supply line 54, which is in communication with inlet 56 of relay valve 48 and, via further compressed-air lines, is in communication with compressed-air reservoir tanks 18, 20.

Parking brake module 14 is provided with an air-flow-boosting valve device in the form of a relay valve 64 for the tractor. Relay valve 64 comprises an inlet 76 in direct or indirect communication via compressed-air lines 66 to 75 with compressed-air reservoir tanks 18, 20. Furthermore, relay valve 64 is provided with an outlet 80 in communication via compressed-air lines 78, 34, 32 with spring-actuator part 30 of brake cylinder 12. Relay valve 64 has a control input 82, which is in communication via a compressed-air line 84 with a valve unit 86 for controlling the parking brake of the tractor.

At its outlet 80, relay valve 64 delivers to a compressed-air line 78 an output pressure that corresponds to the pressure injected via compressed-air line 34 at control input 82 and, thus, to the pressure in a control chamber of relay valve 64. Relay valve 64 draws the compressed air needed for this purpose from compressed-air supply line 66, which is in communication with inlet 76 of relay valve 64. Any venting of compressed-air line 78 that may be necessary takes place via a vent port 88 in indirect or direct communication with atmosphere. In the exemplary embodiment shown in FIG. 1, this vent port 88 is in communication via a compressed-air line 90 with a venting device 92.

Parking brake module 14 is further provided upstream from compressed-air reservoir tanks 18, 20 with check valves 94, 96, respectively, which, in the event of a pressure drop or of detachment of or damage to compressed-air lines 71 and 75, respectively, to compressed-air reservoir tanks 20 and 18, respectively, prevent a pressure loss from occurring in parking brake module 14. Such a pressure drop or pressure loss is undesirable, since it might lead to sudden application of the parking brake and, thus, to emergency braking of the tractor. Under certain circumstances, this might cause an uncontrollable driving situation.

Parking brake module 14 is provided with a plurality of pneumatic ports 98, 100, 102, 104, 106. Via port 98, compressed-air line 74 is in communication with compressed-air line 75 for connection of first compressed-air reservoir tank 18. Via port 100, compressed-air line 70 is in communication with compressed-air line 71 for connection of second compressed-air reservoir tank 20. Via port 102, compressed-air line 78 is in communication with compressed-air line 34 for placing relay valve 64 in communication with brake cylinder 12. Via port 104, compressed-air line 44 to relay valve 48 is in communication, via the trailer controller, with a compressed-air line 108 and, thus, via compressed-air lines 67 to 75, with compressed-air reservoir tanks 18, 20. Via port 106, compressed-air line 62 to control input 50 of relay valve 48 for the trailer controller is in communication with a valve unit 110 disposed in parking brake module 14 for controlling the trailer parking brake.

Parking brake module 14 is further provided with a pressure sensor 114, which is mounted within cover 112 and is used for monitoring the reservoir pressure inside parking brake module 14. For this purpose, pressure sensor 114 is in communication, via a pressure line 116, with pressure line 72 and, thus, is directly or indirectly in communication with pressure lines 66 to 71, 73 to 75 as well as 108, 44 and 46.

Electronic control unit 40, by means of which valve unit 86 as well as valve unit 110 can be switched electrically via electrical lines 118, 120, is also disposed in the area of cover 112.

Valve units 86 and 110 are of identical design. Accordingly, hereinafter, the discussion will focus on valve unit 86.

In one embodiment, valve units 86 and 110 are stand-alone subassemblies. Alternatively, however, valve units 86 and 110 are implemented integrally in a single uniform parking brake module 14, either individually or together with relay valve 64 and, possibly, also with relay valve 48. When valve units 86 and 110 are stand-alone components, the valve units have pneumatic ports, as will be explained in greater detail hereinafter. However, if the valve units are integrated in the parking brake module, such ports are omitted in favor of appropriate connecting lines. This application, therefore, uses the generic term "connecting member", which is to be understood to comprise any kind of connecting means, including both ports and other types of connections, such as, for example, pneumatic connecting lines, connecting ducts or bores or other passages and other like elements.

Also, the term "port" as used in connection with valve units 86 and 110 is to be understood to refer to a connecting member, so that, in this way, the embodiment in which valve units 86 and 110 are integrated in parking brake module 14 can also be discussed.

Valve unit 86 is provided with a first port 122, which, via compressed-air lines 126, 68 to 75, is in communication with compressed-air reservoir tanks 18, 20. Valve unit 86 is further provided with a second port 128, which, via compressed-air line 130, is in communication with venting device 92. Venting device 86 is further provided with a third port 132, which, via compressed-air line 84, is in communication with control input 82 of relay valve 64. Valve unit 86 is designed as a double-armature solenoid valve. The structural design can be seen in FIG. 2, which shows double-armature solenoid valve 134.

Double-armature solenoid valve 134 is provided with two magnet armatures 138, 140 disposed in a common armature-guide arrangement 136. It is constructed and arranged as an armature-guide tube, wherein the inside tube diameter is constant at least over some portions and is matched to the outside diameter of magnet armatures 138, 140. A first magnet armature, namely, primary armature 138, is loaded by means of a spring 142 and is, therefore, compressed toward the right in the diagram according to FIG. 2. Analogously, a second magnet armature, namely, secondary armature 140, is loaded with a spring 144, which compresses magnet armature 140 toward the left in the diagram shown in FIG. 2. Armature-guide arrangement 136 is surrounded by a solenoid 146. The outside diameter of armature-guide arrangement 136 is matched to the inside diameter of solenoid 146. Upon injection of suitable solenoid currents into solenoid 146, solenoid 146 pulls primary armature 138 and, possibly, secondary armature 140 in the direction of the interior of the coil. Primary armature 138 is provided as an operating element for a vent valve 148 (FIG. 1), and secondary armature 140 is provided as an operating element for an air-admission valve 150. Solenoid 146 is provided with two electrical ports 152, which are connected by means of electrical lines 118 to electronic control unit 40.

Figure 2:
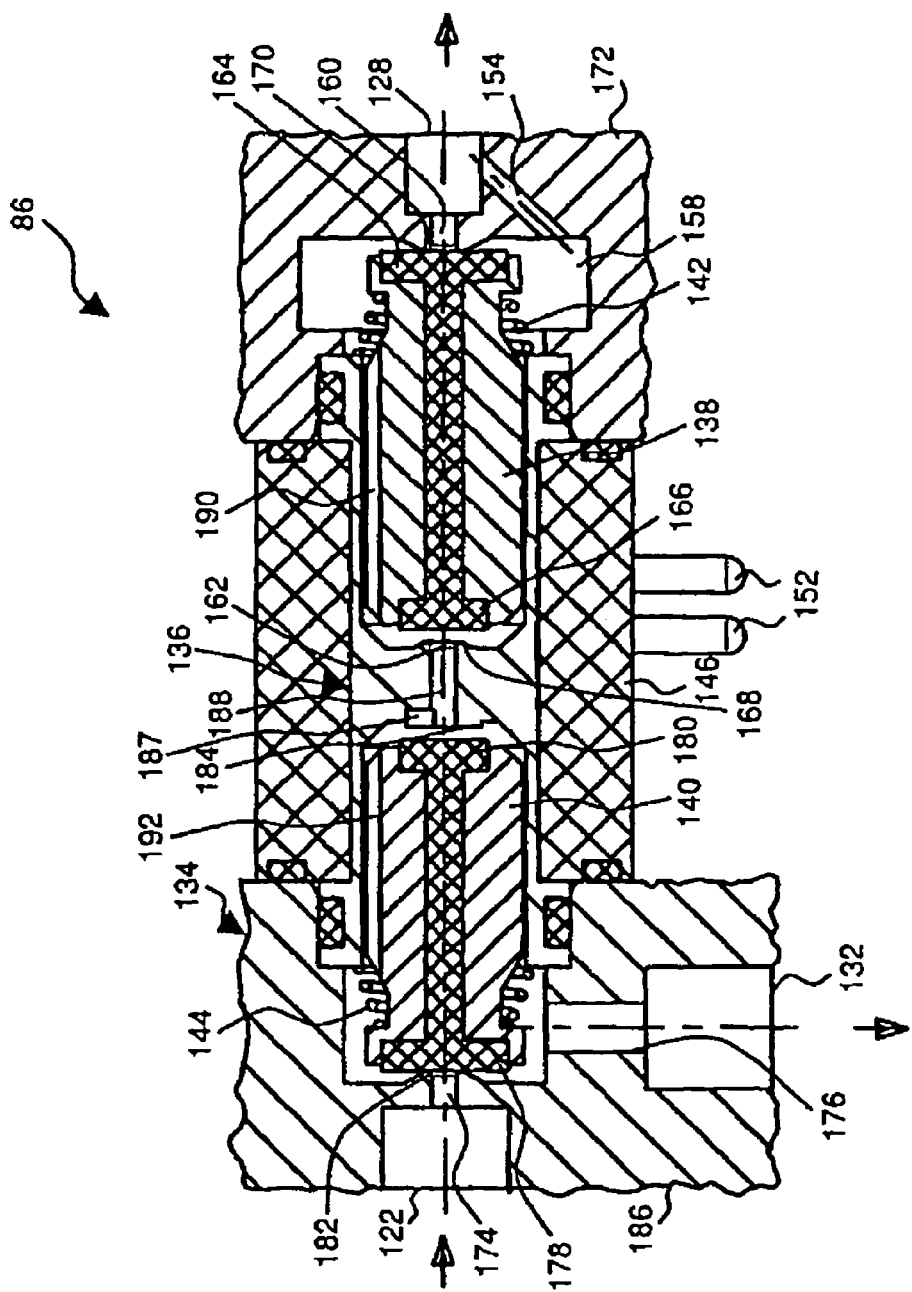
FIG. 2 shows a valve unit according to an exemplary embodiment of the present invention for a brake control device according to FIG. 1.
Figure 3:
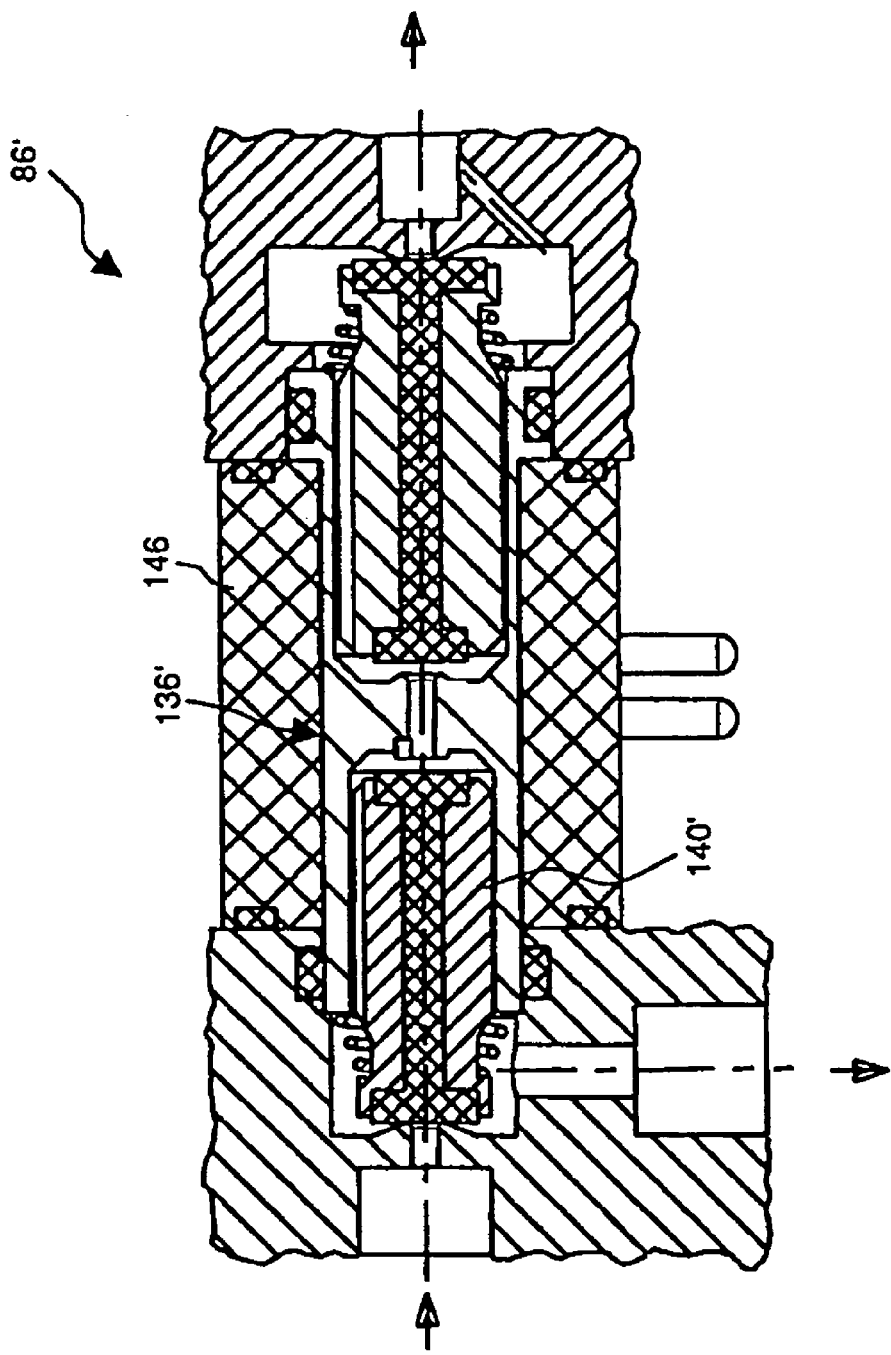
FIG. 3 shows a valve unit according to a further exemplary embodiment of the present invention for a brake control device according to FIG. 1.

When solenoid 146 is de-energized, both primary armature 138 and secondary armature 140 are located in their home positions, determined by springs 142, 144, as illustrated in FIGS. 1 to 3. Air-admission valve 150, when in its home position, shuts off first port 122 from third port 132, and vent valve 148, when in its home position, places second port 128 in communication with third port 132 via an interposed orifice 154 acting as a throttle. A compressed-air accumulator 158 that can be switched by means of primary armature 138 is provided between orifice 154 and an outlet 160 of vent valve 148. Compressed-air accumulator 158 is designed as a chamber within valve unit 86.

Outlet 160 of vent valve 148 is in communication with second port 128 of valve unit 86. Furthermore, vent valve 148 has an inlet 162, which, via corresponding connecting ducts within valve unit 86, is in communication with third port 132.

In the home position of primary armature 138, inlet 162 is pneumatically in communication, via compressed-air accumulator 158 and orifice 154, with second port 128. Furthermore, second outlet 160 is shut off in the home position of primary armature 138. In a switched position of primary armature 138, or, in other words, when the primary armature is pulled inward in the direction of the interior of solenoid 146 by injection of a first solenoid current of predetermined magnitude, compressed-air accumulator 158 is pneumatically in communication with second outlet 160 and inlet 162 is shut off.

Elastomeric inserts 164, 166 are disposed at the respective two ends of primary armature 138. Elastomeric inserts 164, 166 can also be formed in one piece, by providing primary armature 138 with a through bore, through which there extends elastomeric inserts 164, 166. Elastomeric inserts 164, 166 each form a valve seat together with a corresponding shaped projection 168 on armature-guide arrangement 136 and, respectively, a shaped projection 170 on a vent-valve head 172.

Vent valve 150 has an inlet 174 in communication with first port 122 of valve unit 86 and an outlet 176 in communication with third port 132. Via corresponding ducts in valve unit 86, outlet 176 is also in pneumatic communication with inlet 162 of the vent valve.

In its home position, secondary armature 140 of air-admission valve 150 shuts off inlet 174 of air-admission valve 150 from its outlet 176. In its switched position, secondary armature 140 places inlet 174 in communication with outlet 176.

Secondary armature 140 is provided with an elastomeric insert 178, 180 at each of its two ends. These elastomeric inserts can also be formed as separate pieces or, as illustrated in FIG. 2, in one piece. In the case of one-piece design, the elastomeric insert passes through a conduit extending through the secondary armature. Elastomeric inserts 178, 180 protruding at the two ends of secondary armature 140 are able to come into contact with corresponding shaped projections 182, 184 on an air-admission valve head 186 or on armature-guide arrangement 136. A valve seat is formed by elastomeric insert 178 and shaped projection 182, by which inlet 174 of air-admission valve 150 can be shut off. By virtue of a recess 187 in the region of shaped projection 184 on armature-guide arrangement 136, the stop between the elastomeric insert and shaped projection 184 always remains open. Furthermore, this stop is pneumatically in communication via a duct-like conduit 188 with inlet 162 of the vent valve.

Primary armature 138 and secondary armature 140 each have a substantially rotationally symmetric design. However, they each have a slot-like recess 190 and 192, respectively, extending along the respective armature. Recess 190 of primary armature 138 establishes communication between inlet 162 of the vent valve and compressed-air accumulator 158 when primary armature 138 is in its home position.

Recess 192 of secondary armature 140 establishes communication between recess 187 or conduit 188 and the outlet of air-admission valve 176, regardless of the switched position of secondary armature 140.

By virtue of this arrangement, vent valve 148 forms a 3/2-way solenoid valve. Air-admission valve 150 forms a 2/2-way solenoid valve.

The valve unit of FIG. 3 corresponds largely to that illustrated in FIG. 2 and therefore bears the reference numeral 86'. Hereinafter, therefore, only the differences with valve unit 86 will be discussed. All other elements are of identical design and/or identical function, as discussed in connection with FIG. 2. To this extent, the foregoing discussion is instructive.

Valve unit 86' shown in FIG. 3 differs from valve unit 86 shown in FIG. 2, on the one hand, by the design of armature-guide arrangement 136' and, on the other hand, by the design of secondary armature 140'.

More particularly, secondary armature 140' is designed with a smaller diameter than that of secondary armature 140 shown in FIG. 2. As a result, a particularly space-saving arrangement is achieved. Consequently, armature-guide arrangement 136' can also be made more slender in the region of secondary armature 140'. In particular, the end of armature-guide arrangement 136' facing secondary armature 140' is designed with uniform cross section. Thus, armature-guide arrangement 136' has an outside contour that corresponds to the inside contour of solenoid 146 substantially over the entire length of armature-guide arrangement 136'; only at its end associated with primary armature 138 does armature-guide arrangement 136' have a projecting or thickened part. This construction of armature-guide arrangement 136' makes it easy to assemble valve unit 86', since armature-guide arrangement 136' can be mounted from one side, namely, from the right side in the orientation shown in FIG. 3. Beyond this, the different diameters of the primary armature and secondary armature result in improved switching behavior of valve unit 86'.

Figure 4:
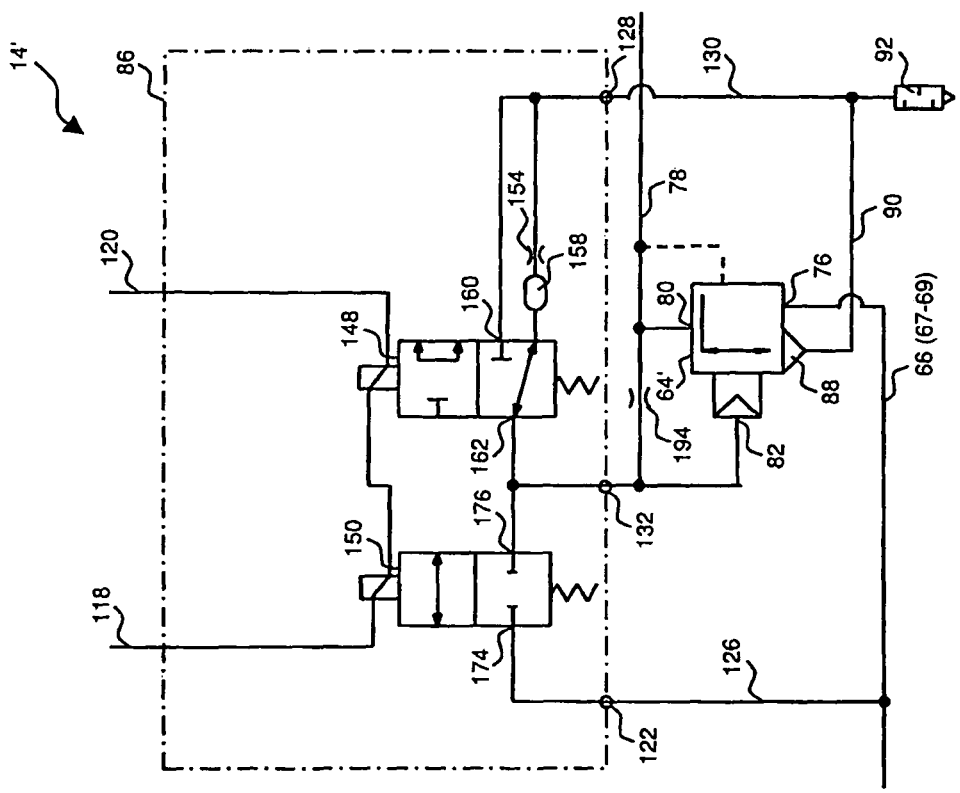
FIG. 4 is a schematic diagram of a brake control device for a parking brake, including a valve unit according to a further exemplary embodiment of the present invention.

FIG. 4 shows a further exemplary embodiment of a parking brake module 14', which corresponds largely to parking brake module 14 shown in FIG. 1. However, parking brake module 14' shown in FIG. 4 reveals only valve unit 86 for the tractor. In FIG. 4, therefore, like reference numerals denote like parts as in FIG. 1, and, so, to this extent, the foregoing discussion should be consulted.

In certain driving situations, such as, for example, during a failure of the electrical power supply, spring-actuator part 30 is to be vented slowly via orifice 154. However, since the control volume of relay valve 64 or 64' is very small, venting of control input 82 of relay valve 64, 64' is permitted only through a very small orifice 154. Therefore, orifice 154 would inherently have to be designed with a very small diameter. However, a very small diameter can become clogged by dirt or ice. In turn, throttled venting could be made inoperative by dirt or ice, and, thus, safe venting of spring-actuator part 30 of the spring-actuated brake cylinders might no longer be assured. Nevertheless, in order to ensure slow venting with a sufficiently large cross section of orifice 154, the control volume of the relay valve is seemingly or, in other words, virtually enlarged by establishing communication between control input 82 and outlet 80 of relay valve 64'. Such communication has the form, for example, of a through bore in the relay piston, thus forming an orifice 194. This orifice 194 increases the amount of air to be vented in the control chamber of relay valve 64'. In this way, the working volume at control input 82 of relay valve 64' can be vented sufficiently slowly despite a sufficiently large opening of orifice 154 to reduce the danger of fouling by dirt or ice.

Orifice 194 of the relay piston of relay valve 64' is advantageously provided with a larger cross-sectional area than the cross-sectional area of orifice 154 of valve unit 86. In this way, the pressure at control input 82 of relay valve 64' corresponds substantially to the pressure at outlet 80 of relay valve 64'. Thus, venting of spring-actuator part 30 no longer takes place via vent port 88 of relay valve 64' or does so to only an immaterial extent. Instead, substantially the entire volume of spring-actuator part 30 as well as the control volume at control input 82 of relay valve 64' is vented via orifice 154 in sufficiently slow manner by virtue of the small opening of orifice 154.

By the inventive double-armature valve having an orifice for slow venting, a valve unit of simple and therefore inexpensive design is provided that simultaneously ensures safe parking of the vehicle even in the event of failure of the electrical power supply. By injection of a high solenoid current, air can be admitted to the relay valve and, thus, to the spring-actuator part of the spring-actuated brake cylinders. By injection of a low current, the pressure can be held at the control input of the relay valve and, thus, also in the spring-actuator part of the spring-actuated brake cylinders. In the case of a pulsed low current at the primary solenoid valve, rapid venting is made possible by rapid to-and-fro movement of the primary armature. In the de-energized condition, on the other hand, only slow venting of the control chamber of the relay valve takes place via an orifice.

Accordingly, the present invention permits simple implementation of a parking brake that ensures a safe condition even in the event of failure of the electrical power supply and, moreover, that can be actuated by purely electrical means; in particular, the pneumatic tubing so common heretofore in the operator's cab for the purpose of activating the parking brake can be omitted, and operator control of the parking brake can be achieved completely via an electrical actuating means.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A valve unit for an electro-pneumatic brake control device for controlling a vehicle brake, said valve unit in communication with a control input of an air-flow-boosting valve device for at least one of (i) controlled admission of air into said valve device and (ii) controlled venting of said valve device, said valve unit comprising an orifice, at least one connecting member, and a double-armature solenoid valve having a spring-loaded primary armature and a spring-loaded secondary armature disposed in a common armature-guide arrangement, each of said primary and secondary armatures being actuatable by a common solenoid, said primary armature being configured to operate a vent valve for venting air from said control input of said air-flow-boosting valve device, said vent valve having an outlet disposed adjacent to said orifice and coupled to a first connecting member of said at least one connecting member, said first connecting member being disposed at an end of said valve unit proximate said vent valve, and said secondary armature being configured to operate an air-admission valve for admitting air into said control input, wherein both said primary armature and said secondary armature are positioned in spring-loaded home position when said solenoid is de-energized such that said air-admission valve shuts off admission of air and said vent valve activates venting, wherein in response to injection of a first solenoid current of preselected intensity flowing through said solenoid, (a) said primary armature is positioned in a primary switched position determined by a magnetic force, and (b) said secondary armature is positioned in said spring-loaded home position, such that said air-admission valve shuts off air admission and said vent valve shuts off venting, wherein in response to injection of a second solenoid current of preselected intensity flowing through said solenoid, said second solenoid current being greater than said first solenoid current, (c) said primary armature is positioned in said primary switched position, and (d) said secondary armature is positioned in a secondary switched position determined by said magnetic force, such that said air-admission valve activates air admission and said vent valve shuts off venting, wherein said outlet and said orifice are in separate communication with said first connecting member, and wherein said vent valve is configured to vent air from said control input through said first connecting member via at least one of said orifice and said outlet.

2. The valve unit according to claim 1, wherein said at least one connecting member comprises a second connecting member in communication with a compressed-air reservoir, and a third connecting member in communication with said control input of said air-flow-boosting valve device, and wherein: in said spring-loaded home position of said primary and secondary armatures, said air-admission valve shuts off said second connecting member from said third connecting member and said vent valve places said first connecting member in communication with said third connecting member, and in said primary switched position of said primary armature and said spring-loaded home position of said secondary armature, said air-admission valve shuts off said second connecting member from said third connecting member and said vent valve shuts off said first connecting member from said third connecting member, and in said primary switched position of said primary armature and said secondary switched position of said secondary armature, said air-admission valve places said second connecting member in communication with said third connecting member and said vent valve shuts off said first connecting member from said third connecting member.

3. The valve unit according to claim 2, wherein when said solenoid is de-energized, said vent valve places said first connecting member in communication with said third connecting member in throttled manner via said orifice.

4. The valve unit according to claim 1, wherein, in response to injection of an alternating solenoid current of a first preselected intensity flowing through said solenoid, both said primary armature and said secondary armature are positioned in said spring-loaded home position, and, in response to injection of an alternating solenoid current having a second preselected intensity, said primary armature is positioned in said primary switched position and said secondary armature is positioned in said spring-loaded home position.

5. The valve unit according to claim 4, wherein at least one of (i) said first preselected intensity is zero and (ii) said second preselected intensity corresponds to said first preselected intensity.

6. The valve unit according to claim 3, further comprising a compressed-air accumulator disposed between said orifice and said outlet.

7. The valve unit according to claim 1, wherein said vent valve is a 3/2-way solenoid valve and said air-admission valve is a 2/2-way solenoid valve.

8. The valve unit according to claim 6, wherein said vent valve includes an inlet in communication with said third connecting member, and wherein said primary armature is constructed and arranged such that, in said spring-loaded home position of said primary armature, said inlet of said vent valve is in communication with said compressed-air accumulator and said outlet of said vent valve is shut off, and in said primary switched position, said compressed-air accumulator is in communication with said outlet of said vent valve and said inlet of said vent valve is shut off.

9. The valve unit according to claim 8, wherein said air-admission valve includes an inlet in communication with said second connecting member and an outlet in communication with said third connecting member and said inlet of said vent valve, and wherein said secondary armature is constructed and arranged such that, in said spring-loaded home position of said secondary armature, said inlet of said air-admission valve is shut off from said outlet of said air-admission valve, and in said secondary switched position, said inlet of said air-admission valve is in communication with said outlet of said air-admission valve.

10. The valve unit according to claim 1, wherein said primary armature and said secondary armature have different diameters.

11. The valve unit according to claim 1, wherein said primary armature and said secondary armature are identical.

12. The valve unit according to claim 1, wherein said primary armature and said secondary armature are pulled with respect to said solenoid, said primary armature being pulled by a different amount than said secondary armature.

13. The valve unit according to claim 1, wherein a primary spring acting on said primary armature exerts a primary spring force on said primary armature that is smaller than a secondary spring force exerted on said secondary armature by a secondary spring acting on said secondary armature.

14. An electro-pneumatic brake control device for controlling a parking brake of a vehicle, comprising pneumatically actuatable brake cylinders for actuation of wheel brakes, at least one of said brake cylinders being a spring-actuated brake cylinder including a spring-actuator part constructed and arranged to actuate said parking brake, at least one valve unit according to claim 2, wherein said third connecting member is in communication with said control input of said air-flow-boosting valve device, and wherein said air-flow-boosting valve device includes an inlet in communication with a compressed-air supply line to said compressed-air reservoir and an outlet in communication with a compressed-air line to said spring-actuator part, pressure at said outlet of said air-flow-boosting valve device being controllable by means of control pressure applied at said control input.

15. The brake control device according to claim 14, wherein said air-flow-boosting valve device is a relay valve including a control input, an outlet and a relay piston, an opening defined in said relay piston placing said outlet of said relay valve in communication in throttled manner with said control input of said relay valve.

16. The brake control device according to claim 15, wherein said opening defined in said relay piston has a larger cross-sectional area than the cross-sectional area of said orifice.

17. An electrically controlled pneumatic vehicle brake system, comprising a service brake, a parking brake, a brake control device, and a valve unit according to claim 1, said service brake including a brake pedal and pneumatically actuatable brake cylinders in operational communication with said brake pedal, at least one of said brake cylinders being a spring-actuated brake cylinder including a spring-actuator part constructed and arranged to actuate said parking brake, said parking brake including a parking brake signal transducer for actuating said parking brake by venting said spring-actuator part.

18. A vehicle, comprising an electrically controlled pneumatic brake system according to claim 17.

19. The valve unit according to claim 10, wherein said secondary armature has a smaller diameter than said first armature.

20. The valve unit according to claim 12, wherein said primary armature is pulled with respect to said solenoid by a greater amount than said secondary armature.

21. The valve unit according to claim 1, wherein said first connecting member is in communication with a venting device.

* * * * *